(12) United States Patent
Yonezawa et al.

(10) Patent No.: US 9,736,783 B2
(45) Date of Patent: Aug. 15, 2017

(54) DEVICE ADAPTER, DEVICE SYSTEM, AND START CONTROL METHOD

(71) Applicant: Yokogawa Electric Corporation, Tokyo (JP)

(72) Inventors: Masaaki Yonezawa, Tokyo (JP); Satoshi Mochizuki, Tokyo (JP); Naoyuki Fujimoto, Tokyo (JP); Minoru Midorikawa, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 0 days.

(21) Appl. No.: 15/125,861

(22) PCT Filed: Mar. 11, 2015

(86) PCT No.: PCT/JP2015/057109
§ 371 (c)(1),
(2) Date: Sep. 13, 2016

(87) PCT Pub. No.: WO2015/141534
PCT Pub. Date: Sep. 24, 2015

(65) Prior Publication Data
US 2017/0006550 A1    Jan. 5, 2017

(30) Foreign Application Priority Data
Mar. 20, 2014    (JP) .................. 2014-058884

(51) Int. Cl.
*H04W 52/02*    (2009.01)
*H04Q 9/00*    (2006.01)
(Continued)

(52) U.S. Cl.
CPC ....... *H04W 52/0261* (2013.01); *H04L 67/303* (2013.01); *H04Q 9/00* (2013.01);
(Continued)

(58) Field of Classification Search
CPC ......... H04W 52/0261; H04W 52/0254; H04W 88/02; H04W 52/346; H04W 52/0209
(Continued)

(56) References Cited

U.S. PATENT DOCUMENTS

2002/0097031 A1*    7/2002    Cook ................. G05B 19/0423
323/273
2008/0211664 A1    9/2008    Griech et al.

FOREIGN PATENT DOCUMENTS

| JP | 10-282161 A | 10/1998 |
| JP | 2005-312112 A | 11/2005 |
| JP | 2012-182720 A | 9/2012 |

OTHER PUBLICATIONS

International Search Report for PCT/JP2015/057109 dated Apr. 7, 2015 [PCT/ISA/210].
(Continued)

Primary Examiner — Keith Ferguson
(74) Attorney, Agent, or Firm — Sughrue Mion, PLLC

(57) ABSTRACT

A device adapter which is connectable to the field devices, includes an interface which is connectable to the field devices, a power source configured to supply electric power to the field devices connected to the interface, and a start controller configured to perform a start control of the field devices connected to the interface to make a total power consumption of the field devices connected to the interface be within a range permitted in accordance with an explosion-proof standard.

20 Claims, 5 Drawing Sheets

(51) Int. Cl.
*H04L 29/08* (2006.01)
*H04L 29/12* (2006.01)
(52) U.S. Cl.
CPC ..... *H04W 52/0219* (2013.01); *H04L 61/2038* (2013.01); *H04L 61/2069* (2013.01); *Y02B 60/50* (2013.01)
(58) Field of Classification Search
USPC ...... 455/517, 500, 522, 69, 507, 445, 426.1, 455/426.2, 550.1, 572, 574; 340/870.39
See application file for complete search history.

(56) References Cited

OTHER PUBLICATIONS

Written Opinion for PCT/JP2015/057109 dated Apr. 7, 2015 [PCT/ISA/237].

\* cited by examiner

| FIELD DEVICE | CONSUMPTION CURRENT |
|---|---|
| 10a | 10mA |
| 10b | 5mA |
| 10c | 3mA |

FIG. 6

| TIME | FIELD DEVICES WHICH SHOULD BE STARTED | TOTAL CONSUMPTION POWER OF FIELD DEVICES WHICH SHOULD BE STARTED | FIELD DEVICES WHICH ARE STARTED ACTUALLY | TOTAL CONSUMPTION POWER OF FIELD DEVICES WHICH ARE STARTED ACTUALLY |
|---|---|---|---|---|
| t1 | 10c | 3mA | 10c | 3mA |
| t2 | 10c, 10b | 8mA | 10c, 10b | 8mA |
| t3 | 10c, 10b, 10a | 18mA | 10c, 10b | 8mA |
| t4 | | | 10a | 10mA |

DEVICE ADAPTER, DEVICE SYSTEM, AND START CONTROL METHOD

CROSS REFERENCE TO RELATED APPLICATIONS

This application is a National Stage of International Application No. PCT/JP2015/057109 filed Mar. 11, 2015, claiming priority based on Japanese Patent Application No. 2014-058884 filed Mar. 20, 2014, the contents of all of which are incorporated herein by reference in their entirety.

TECHNICAL FIELD

The present invention relates to a device adapter, a device system, and a start control method.

Priority is claimed on Japanese Patent Application No. 2014-058884, filed on Mar. 20, 2014, the contents of which are incorporated herein by reference.

BACKGROUND ART

Conventionally, a distributed control system (DCS) is established and an advanced automatic operation is implemented in a plant and a factory. In the distributed control system, field devices (for example, a measurement device and a manipulation device) and a control device controlling the field devices are connected to each other through a communication means. Although most of the field devices included in the distributed control system perform wire communication, a wireless field device which performs wireless communication in conformity with industrial wireless communication standards, such as ISA100.11a and WirelessHART (registered trademark), is realized in recent years.

An input/output unit, a wireless communicator, and a controller are disposed in a housing of the above-described wireless field device. The input/output unit generally performs measurement or operation of various state quantities (for example, pressure, temperature, and flow quantity). The wireless communicator performs wireless communication in conformity with the above-described industrial wireless communication standards. The controller totally controls operation of the wireless field device. It is not necessary to connect the wireless field device to a communication line or a communication bus like the conventional field device, and basically the wireless field device is independently installed in the plant. For this reason, a battery is often built in the wireless field device as a single power source.

The following patent document 1 discloses that a wireless module is attached to the conventional field device which does not have a wireless communicator, and the wireless module is capable of operating the conventional field device as a wireless field device. Specifically, the wireless module disclosed in the following patent document 1 includes an interface, a wireless communicator, and a power source. The interface is connected to the conventional field device. The wireless communicator performs wireless communication. The power source supplies electric power to the conventional field device through the interface. If a signal from the field device is input to the wireless module through the interface, the wireless module transmits the signal from the wireless communicator to a transmission destination (for example, a host controller). If the wireless communicator receives a signal of which destination is the field device, the wireless module outputs the received signal to the field device through the interface.

CITATION LIST

Patent Literature

[Patent document 1] U.S. Patent Application Publication No. 2008/0211664

SUMMARY OF INVENTION

Technical Problem

Basically, the wireless module disclosed in the patent document 1 is mounted on a field device, and the wireless module operates the field device as a wireless field device. The number of field devices prepared in the plant is increased or decreased generally in accordance with a scale of the plant. In a large-scale plant, the number of field devices may exceed 10,000. In order to operate all the field devices as wireless field devices, it is necessary to mount, on all the field devices, the wireless module disclosed in the patent document 1. For this reason, there is a problem that costs increase greatly.

Then, if one wireless module is mounted on a plurality of field devices, the total number of required wireless modules can be reduced. For this reason, it is thought that costs can be reduced. However, since the wireless module supplies electric power to the field devices as described above, if the number of connected field devices increases, total electric power which needs to be supplied from the wireless module to the field devices increases. For this reason, there is a problem in view of an explosion-proof.

The above-mentioned problem arises not only when connecting a wireless module to a plurality of field devices, but also when connecting an adapter (device adapter) which has a certain function to a plurality of field devices. For example, the problem arises also when connecting a device adapter which has communication functions other than wireless communication, such as field bus communication, Ethernet (registered trademark) communication, USB (Universal Serial Bus) communication, and serial communication. Furthermore, the problem arises also when connecting a device adapter which has functions other than communication function, such as display function, user interface function, and data storage function.

Solution to Problem

In order to solve the above problems, a device adapter of the present invention which is connectable to the field devices, includes an interface which is connectable to the field devices, a power source configured to supply electric power to the field devices connected to the interface, and a start controller configured to perform a start control of the field devices connected to the interface to make a total power consumption of the field devices connected to the interface be within a range permitted in accordance with an explosion-proof standard.

By this invention, a start controller performs a start control of field devices connected to an interface in order to make total electric power, which is consumed by the field devices connected to the interface, be within a range permitted in accordance with an explosion-proof standard.

Moreover, in the device adapter of the present invention, the start controller may be configured to dynamically calculate the total power consumption of the field devices which should be started, and if the total power consumption exceeds the range permitted in accordance with the explosion-proof standard, the start controller may dynamically change a number of the field devices which should be started.

Moreover, in the device adapter of the present invention, the start controller may be configured to start the field devices connected to the interface individually beforehand to measure a power consumption of each of the field devices which are in an operating state.

Moreover, in the device adapter of the present invention, first identification information which is determined uniquely may be assigned to each of the field devices, and the start controller may be configured to perform the start control of the field devices by modulating the electric power supplied from the power source to the field devices in accordance with the first identification information.

Moreover, in the device adapter of the present invention, the field devices may be classified into groups which have been set to make the total power consumption be within the range permitted in accordance with the explosion-proof standard, second identification information which is determined uniquely may be assigned to each of the groups, and the start controller may be configured to perform the start control of the field devices by modulating the electric power supplied from the power source to the field devices in accordance with the second identification information.

Moreover, the device adapter of the present invention may further include a wireless communicator configured to wirelessly transmit signals which have been transmitted from the field devices, and receive signals which have been wirelessly transmitted toward the field devices.

Moreover, the device adapter of the present invention may further include a storage which stores a table representing a consumption current of each of the field devices in an operating state, and the start controller may be configured to calculate, based on the table stored in the storage, the total power consumption of the field devices which should be started.

Moreover, in the device adapter of the present invention, if a field device is newly connected to the device adapter, the start controller may measure a power consumption of the field device which is newly connected to the device adapter, and update the table stored in the storage by using the measured power consumption.

A device system of the present invention includes field devices, and a device adapter which is connectable to the field devices. The device adapter includes an interface which is connectable to the field devices, a power source configured to supply electric power to the field devices connected to the interface, and a start controller configured to perform a start control of the field devices connected to the interface to make a total power consumption of the field devices connected to the interface be within a range permitted in accordance with an explosion-proof standard.

Moreover, in the device system of the present invention, the start controller may be configured to dynamically calculate the total power consumption of the field devices which should be started, and if the total power consumption exceeds the range permitted in accordance with the explosion-proof standard, the start controller may dynamically change a number of the field devices which should be started.

Moreover, in the device system of the present invention, the start controller may be configured to start the field devices connected to the interface individually beforehand to measure a power consumption of each of the field devices which are in an operating state.

Moreover, in the device system of the present invention, first identification information which is determined uniquely may be assigned to each of the field devices, and the start controller may be configured to perform the start control of the field devices by modulating the electric power supplied from the power source to the field devices in accordance with the first identification information.

Moreover, in the device system of the present invention, the field devices may be classified into groups which have been set to make the total power consumption be within the range permitted in accordance with the explosion-proof standard, second identification information which is determined uniquely may be assigned to each of the groups, and the start controller may be configured to perform the start control of the field devices by modulating the electric power supplied from the power source to the field devices in accordance with the second identification information.

Moreover, the device system of the present invention may further include a wireless communicator configured to wirelessly transmit signals which have been transmitted from the field devices, and receive signals which have been wirelessly transmitted toward the field devices.

Moreover, the device system of the present invention may further include a storage which stores a table representing a consumption current of each of the field devices in an operating state, and the start controller may be configured to calculate, based on the table stored in the storage, the total power consumption of the field devices which should be started.

Moreover, in the device system of the present invention, if a field device is newly connected to the device adapter, the start controller may measure a power consumption of the field device which is newly connected to the device adapter, and update the table stored in the storage by using the measured power consumption.

A start control method of the present invention for performing, by a start controller, a start control of field devices which are connectable to a device adapter, includes identifying, by the start controller, field devices which should be started out of the field devices, calculating, by the start controller, a total power consumption of the identified field devices, and performing, by the start controller, the start control of the field devices to make the calculated total power consumption be within a range permitted in accordance with an explosion-proof standard.

Moreover, the start control method of the present invention may further include dynamically calculating, by the start controller, the total power consumption of the field devices which should be started, and dynamically changing, by the start controller, a number of the field devices which should be started if the total power consumption exceeds the range permitted in accordance with the explosion-proof standard.

Moreover, the start control method of the present invention may further include starting, by the start controller, the field devices connected to the interface individually beforehand to measure a power consumption of each of the field devices which are in an operating state.

Moreover, in the start control method of the present invention, first identification information which is determined uniquely may be assigned to each of the field devices. The start control method may further include performing, by the start controller, the start control of the field devices by modulating the electric power supplied from the power source to the field devices in accordance with the first identification information.

Moreover, in the start control method of the present invention, the field devices are classified into groups which have been set to make the total power consumption be within the range permitted in accordance with the explosion-proof standard, and second identification information which is determined uniquely is assigned to each of the groups. The start control method may further include performing, by the start controller, the start control of the field devices by modulating the electric power supplied from the power source to the field devices in accordance with the second identification information.

Moreover, in the start control method of the present invention, a wireless communicator is prepared in the device adapter. The start control method may further include wirelessly transmitting, by the wireless communicator, signals which have been transmitted from the field devices, and receiving, by the wireless communicator, signals which have been wirelessly transmitted toward the field devices.

Moreover, the start control method of the present invention may further include reading, by the start controller, a table representing a consumption current of each of the field devices in an operating state out of a storage, and calculating, by the start controller, the total power consumption of the field devices which should be started.

Moreover, the start control method of the present invention may further include if a field device is newly connected to the device adapter, measuring, by the start controller, a power consumption of the field device which is newly connected to the device adapter, and updating, by the start controller, the table stored in the storage by using the measured power consumption.

Advantageous Effects of Invention

By the present invention, a start controller performs a start control of field devices connected to an interface in order to make total electric power, which is consumed by the field devices connected to the interface, be within a range permitted in accordance with an explosion-proof standard. For this reason, the present invention can operate a plurality of field devices in conformity with an explosion-proof standard.

BRIEF DESCRIPTION OF DRAWINGS

FIG. 6 is a drawing illustrating the total consumption current in each time shown in FIG. 4.

DESCRIPTION OF EMBODIMENTS

An aspect of embodiments of the present invention is to provide a device adapter, a device system including the device adapter, and a start control method which can operate a plurality of field devices in conformity with an explosion-proof standard.

Figure 1:
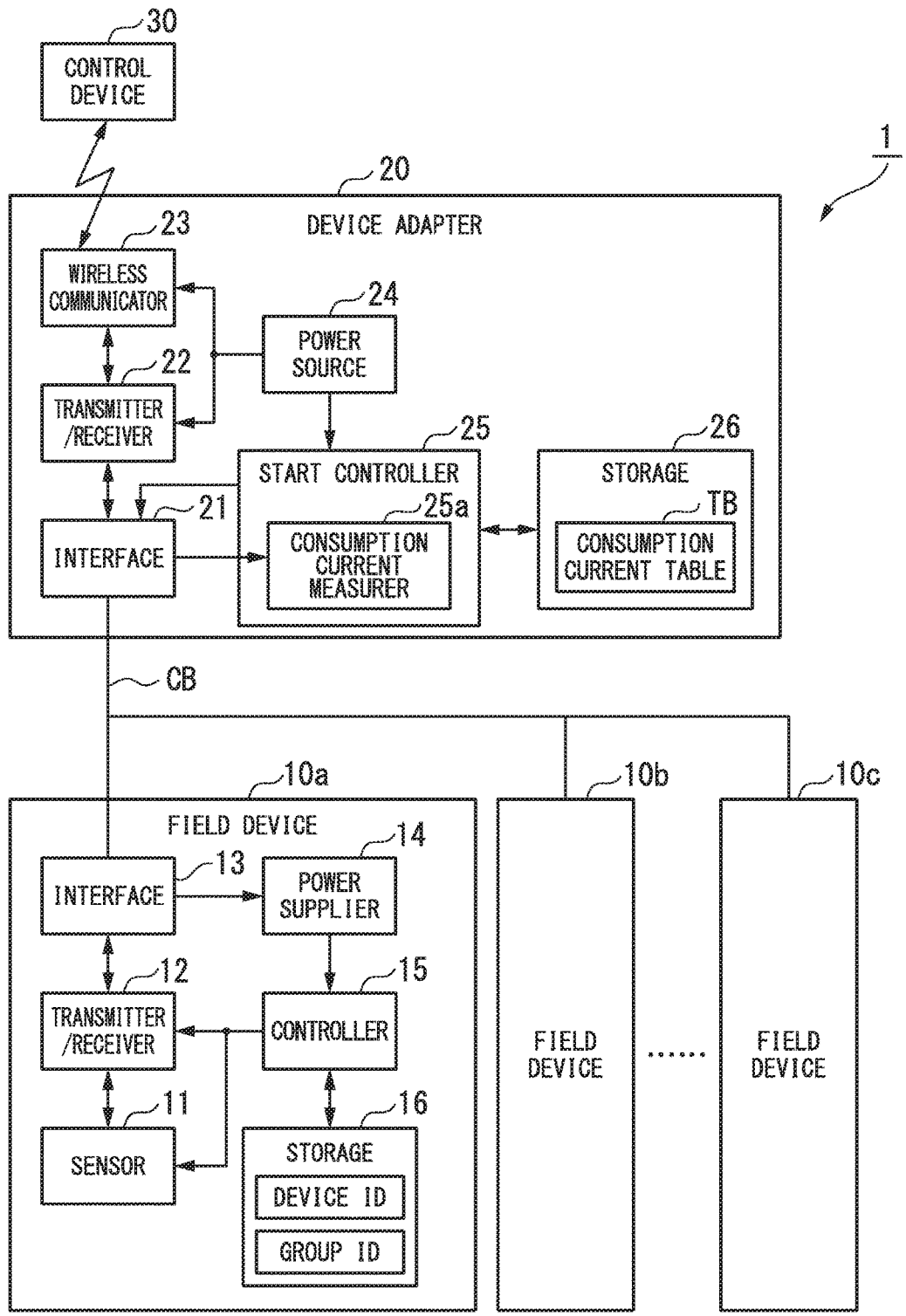
FIG. 1 is a block diagram illustrating a main configuration of the device system in an embodiment of the present invention.

Hereinafter, a device adapter, a device system, and a start control method in an embodiment of the present invention will be described in detail, with reference to drawings. FIG. 1 is a block diagram illustrating a main configuration of the device system in an embodiment of the present invention. As shown in FIG. 1, the device system 1 of the present embodiment is equipped with field devices 10a to 10c and a device adapter 20. A control device 30 receives measurement values of various kinds of state quantities (for example, pressure, temperature, flow quantity, or the like) from the field devices 10a to 10c, and the control device 30 controls the field devices 10a to 10c based on the received measurement values. In the device system 1, the device adapter 20 wirelessly transmits, to the control device 30, signals which have been obtained from the field devices 10a to 10c. Moreover, in the device system 1, the device adapter 20 receives signals which have been transmitted wirelessly from the control device 30 toward the field devices 10a to 10c.

Here, the field devices 10a to 10c and the device adapter 20 are connected to each other through a cable CB. The cable CB can transmit various kinds of signals transmitted and received between the field devices 10a to 10c and the device adapter 20, and the cable CB can also supply electric power from the device adapter 20 to the field devices 10a to 10c. Although the number of the field devices connected to the device adapter 20 is arbitrary, the number of the field devices is set as a number in which total power consumption does not greatly exceed a range specified by an explosion-proof standard. The explosion-proof standard is determined in accordance with a law of a country where the device system 1 is used. As an example of strictest restriction of an explosion-proof standard, it is determined that voltage is equal to or less than 1.2 [V], current is equal to or less than 100 [mA], and electric power is equal to or less than 25 [mW].

The field devices 10a to 10c are such as a sensor device (for example, a flowmeter and a temperature sensor), a valve device (for example, a flow control valve and an on-off valve), an actuator device (for example, a fan and a motor), an imaging device (for example, a camera and a video camera recording circumstances and objects in the plant), a sound device (for example, a microphone collecting abnormal noise in the plant, and a speaker generating alarm sound), a position detection device outputting position information of the each device, and other devices installed in a field of the plant. In the present embodiment, in order to explain simply, the field devices 10a to 10c are sensor devices which measure temperature, flow quantity, and pressure.

Each of the field devices 10a to 10c is equipped with a sensor 11, a transmitter/receiver 12, an interface 13, a power supplier 14, a controller 15, and storage 16. Since the field devices 10a to 10c are generally the same configuration, a configuration of the field device 10a which measures temperature will be mainly described below, and descriptions of configurations of the field devices 10b and 10c will be omitted.

The sensor 11 is activated by electric power supplied from the controller 15, and the controller 15 controls the sensor 11 to measure temperature which is a measurement target. The transmitter/receiver 12 is activated by electric power supplied from the controller 15 like the sensor 11, and the controller 15 controls the transmitter/receiver 12 to communicate with the device adapter 20 through the cable CB. Specifically, the transmitter/receiver 12 transmits a measurement result (temperature) of the sensor 11 to the device adapter 20, and the transmitter/receiver 12 receives a signal (for example, signal for setting a measurement range of the sensor 11) from the device adapter 20.

The interface 13 is an interface for connecting the device adapter 20 to the field device 10a through the cable CB. The interface 13 is activated by electric power supplied from the device adapter 20. The interface 13 outputs, to the cable CB, a signal from the transmitter/receiver 12 (a signal transmitted from the field device 11a to the device adapter 20). Moreover, the electric power supplied from the device adapter 20 and a signal superimposed on the electric power (a signal transmitted from the device adapter 20 to the field device 11a) are separated.

The power supplier 14 temporarily stores the electric power separated by the interface 13. The power supplier 14 converts the stored electric power into a voltage which is suitable for being used by the field device 10a, and the power supplier 14 supplies it to the controller 15. If the electric power supplied from the device adapter 20 is pulse-modulated (details will be described later), the power supplier 14 calculates the number of the pulses and outputs the calculation result to the controller 15. The power supplier 14 is also activated by the electric power supplied from the device adapter 20.

The controller 15 is activated by the electric power supplied from the power supplier 14, and the controller 15 controls the sensor 11 and the transmitter/receiver 12. Specifically, the controller 15 determines whether or not the calculation result of the number of pulses output from the power supplier 14 is the same as a device ID or a group ID (details will be described later) stored in the storage 16. If it is the same as the device ID or the group ID, the controller 15 supplies electric power to the sensor 11 and the transmitter/receiver 12 in order to activate them (the field device 10a is started). On the other hand, the calculation result of the number of pulses output from the power supplier 14 is not the same as the device ID and the group ID stored in the storage 16, the controller 15 does not supply electric power to the sensor 11 and the transmitter/receiver 12 (the field device 10a is not started).

For example, the storage 16 is equipped with a non-volatile memory, such as a flash ROM (Read Only Memory), an EEPROM (Electrically Erasable and Programmable ROM), or the like. The storage 16 stores the device ID (first identification information) and the group ID (second identification information). Here, the device ID is identification information which has been assigned to each of the field devices 10a to 10c, and the device ID is determined uniquely. The group ID is identification information which has been assigned to each of groups to which the field devices 10a to 10c belongs, and the group ID is determined uniquely. The field devices 10a to 10c are classified into groups, and the group ID is assigned to each group. Although the classification method of groups is arbitrary, for example, the field devices are classified into groups which have been set to make total power consumption be within a range permitted in accordance with an explosion-proof standard.

Since the device ID is assigned to each of the field devices 10a to 10c, one device ID is stored in the storage 16. On the other hand, the group ID is assigned to each group to which the field devices 10a to 10c belong. Since the field devices 10a to 10c can belong to a plurality of groups, a plurality of group IDs may be stored in the storage 16.

For example, the field device 10a can belong to a first group to which the three field devices 10a to 10c belong, a second group to which the two field devices 10a and 10b belong, and a third group to which the two field devices 10a and 10c belong. If the field device 10a belongs to the first group to the third group, three group IDs assigned to the first group to the third group are stored in the storage 16 of the field device 10a.

The device adapter 20 wirelessly transmits signals, which have been transmitted from the field devices 10a to 10c through the cable CB. The device adapter 20 receives signals which have been wirelessly transmitted toward the field devices 10a to 10c, and the device adapter 20 transmits it to the field devices 10a to 10c through the cable CB. For example, a transmission destination of a wireless signal transmitted from the device adapter 20 and a transmission source of a signal transmitted wirelessly toward the field devices 10a to 10c are a host controller (not shown). The device adapter 20 supplies electric power to the field devices 10a to 10c, and the device adapter 20 performs a start control of the field devices 10a to 10c.

The device adapter 20 is equipped with an interface 21, a transmitter/receiver 22, a wireless communicator 23, a power source 24, a start controller 25, and storage 26. The interface 21 is connected to the field devices 10a to 10c through the cable CB. The interface 21 superimposes a signal from the transmitter/receiver 22 (a signal which should be transmitted to the field devices 10a to 10c) on electric power which should be supplied to the field devices 10a to 10c (electric power supplied from the start controller 25), and the interface 21 outputs it to the cable CB. Moreover, the interface 21 receives signals from the field devices 10a to 10c transmitted through the cable CB, and the interface 21 outputs the received signal to the transmitter/receiver 22.

The transmitter/receiver 22 is activated by electric power supplied from the power source 24, and the transmitter/receiver 22 communicates with the field devices 10a to 10c through the cable CB. Specifically, the transmitter/receiver 22 receives signals (for example, measurement result of temperature) transmitted from the field devices 10a to 10c through the cable CB, and outputs the received signals to the wireless communicator 23. Moreover, the transmitter/receiver 22 transmits a signal received by the wireless communicator 23 to the field devices 10a to 10c.

The wireless communicator 23 is activated by electric power supplied from the power source 24. The wireless communicator 23 wirelessly transmits, to the control device 30, a signal output from the transmitter/receiver 22 (a signal transmitted from the field devices 10a to 10c to the device adapter 20). Moreover, the wireless communicator 23 receives a signal wirelessly transmitted from the control device 30 (a signal transmitted toward the field devices 10a to 10c), and outputs the received signal to the transmitter/receiver 22. For example, the wireless communication performed by the wireless communicator 23 is in conformity with a wireless communication standard ISA100.11a.

The power source 24 is equipped with an electric source (not shown) which supplies electric power and an electric source circuit (not shown) which converts the electric power from the electric source into electric power which is suitable for being used in the device adapter 20. The power source 24 supplies electric power to the transmitter/receiver 22, the wireless communicator 23, and the start controller 25. Here, the electric source may be a battery (for example, a primary battery with very little self-discharge, such as a thionyl chloride lithium battery), or a power generation circuit which performs environmental power generation (for example, energy harvest, such as a solar cell).

The start controller 25 is activated by electric power supplied from the power source 24, and the start controller 25 performs a start control of the field devices 10a to 10c connected to the interface 21. Specifically, the start controller 25 performs the start control of the field devices 10a to 10c connected to the interface 21 in order to make total electric power, which is consumed by the field devices 10a to 10c connected to the interface 21, be within a range permitted in accordance with an explosion-proof standard. The start controller 25 performs the start control in order to operate the field devices 10a to 10c connected to the device adapter 20 in conformity with an explosion-proof standard.

More specifically, the start controller 25 dynamically calculates the total power consumption of the field devices which should be started, out of the field devices 10a to 10c connected to the interface 21. Next, if the calculated total power consumption exceeds a range permitted in accordance with the explosion-proof standard, the start controller 25 dynamically changes (reduces) the number of the field devices which should be started. For example, in a case that the field devices which should be started are the field devices 10a to 10c, if the total power consumption of the field devices 10a to 10c exceeds the range permitted in accordance with the explosion-proof standard, the start controller 25 starts only the field devices 10a and 10b except for the field device 10c. For example, the start controller 25 starts the excepted field device 10c individually at a timing which is different from the timing when the field devices 10a and 10b have been started.

Here, a standard for determining a field device which is to be excepted from the field devices which should be started (in the above-described example, a standard for excepting the field device 10c) is determined arbitrarily. For example, the start controller 25 may determine a field device which is to be excepted based on a magnitude of power consumption. The start controller 25 may also determine a field device which is to be excepted based on a length of a starting cycle. The start controller 25 may also associate a priority with respect to field devices which should be started, and determine a field device which is to be excepted based on the priority.

The start controller 25 performs the start control of the field devices by modulating the electric power supplied from the power source 24 to the field devices 10a to 10c (specifically, the electric power at a time of starting power supply to the field devices 10a to 10c) in accordance with the device ID or the group ID. For example, if the device IDs assigned to the field devices 10a to 10c are "1" to "3" respectively, the start controller 25 modulates the electric power from the power source 24 as follows. Specifically, if the start controller 25 starts the field device 10a, the start controller 25 modulates the electric power supplied from the power source 24 in order to contain one pulse. If the start controller 25 starts the field device 10b, the start controller 25 modulates the electric power supplied from the power source 24 in order to contain two pulses. If the start controller 25 starts the field device 10c, the start controller 25 modulates the electric power supplied from the power source 24 in order to contain three pulses.

Moreover, for example, if a group ID assigned to the first group to which the three field devices 10a to 10c belong is "4", a group ID assigned to the second group to which the two field devices 10a and 10b belong is "5", and a group ID assigned to the third group to which the two field devices 10a and 10c belong is "6", the start controller 25 modulates the electric power from the power source 24 as follows. Specifically, if the start controller 25 starts the field devices 10a to 10c belonging to the first group, the start controller 25 modulates the electric power supplied from the power source 24 in order to contain four pulses. If the start controller 25 starts the field devices 10a and 10b belonging to the second group, the start controller 25 modulates the electric power supplied from the power source 24 in order to contain five pulses. If the start controller 25 starts the field devices 10a and 10c belonging to the third group, the start controller 25 modulates the electric power supplied from the power source 24 in order to contain six pulses.

Figures 2, 3:
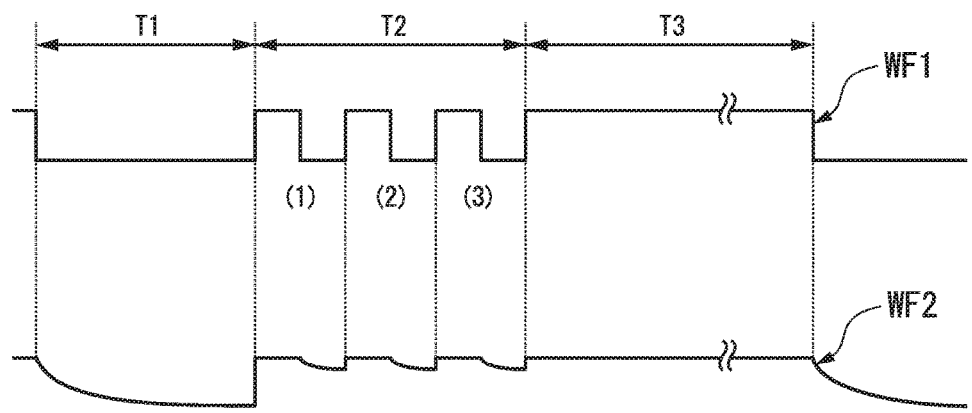
FIG. 2 is a drawing illustrating an example of an electric power waveform in an embodiment of the present invention.
FIG. 3 is a drawing illustrating an example of the consumption current table used by the device adapter in an embodiment of the present invention.

FIG. 2 is a drawing illustrating an example of an electric power waveform in an embodiment of the present invention. In FIG. 2, the waveform indicated by the reference sign WF1 represents a waveform of electric power supplied from the device adapter 20 to the field devices 10a to 10c, and the waveform indicated by the reference sign WF2 represents a waveform of electric power received by the field devices 10a to 10c. In FIG. 2, the period T1 is a period when the electric power is not supplied from the device adapter 20 to the field devices 10a to 10c. The period T2 is a period when the electric power supply to the field devices 10a to 10c is started and the modulation in accordance with the device ID or the group ID is performed. The period T3 is a period when the electric power is continuously supplied.

The electric power waveform WF1 shown in FIG. 2 is modulated in order to contain three pulses during the period T2 immediately after starting to supply electric power to the field devices 10a to 10c. Therefore, if the electric power shown in FIG. 2 is received by the field devices 10a to 10c, only the field device 10c is activated, and the field devices 10a and 10b are not activated. Moreover, the electric power supplied to the field devices 10a to 10c is temporarily stored by the power supplier 14 prepared in the field devices 10a to 10c. For this reason, as shown by the electric power waveform WF2 in FIG. 2, although the electric power supplied to the field devices 10a to 10c has small pulsation during the period T2, electric power required for activating the field devices 10a to 10c can be obtained.

The start controller 25 is equipped with a consumption current measurer 25a which measures a consumption current of the field devices 10a to 10c. If a voltage of the electric power supplied to the field devices 10a to 10c is constant, the consumption current measurer 25a can also measure the power consumption of the field devices 10a to 10c by measuring the consumption current of the field devices 10a to 10c. The consumption current measurer 25a measures the current consumed by the field devices 10a to 10c (correctly, started field devices of the field devices 10a to 10c) by measuring the current which flows from the interface 21 into the cable CB.

As described above, the start controller 25 modulates the electric power, which is supplied from the power source 24 to the field devices 10a to 10c, in accordance with the device ID assigned to each of the field devices 10a to 10c, so that the field devices 10a to 10c can be started individually. For this reason, the consumption current measurer 25a can measure the consumption current of each of the field devices 10a to 10c by measuring the consumption current in a state where the field devices 10a to 10c are started individually beforehand.

Like the storage 16 of the field device 10a, the storage 26 is equipped with a non-volatile memory, such as a flash ROM, an EEPROM, or the like. The storage 26 stores a consumption current table TB. The consumption current table TB is a table representing a consumption current of each of the field devices 10a to 10c in an operating state. FIG. 3 is a drawing illustrating an example of the consumption current table used by the device adapter in an embodiment of the present invention.

As shown in FIG. 3, the consumption current table TB is a table in which information for identifying the field devices 10a to 10c and consumption current have been associated with each other. In the consumption current table TB shown in FIG. 3, a consumption current 10 [mA] is associated with the field device 10a, a consumption current 5 [mA] is associated with the field device 10b, and a consumption current 3 [mA] is associated with the field device 10c. For example, the consumption current measurer 25a measures the consumption current in a state where the field devices 10a to 10c are started individually beforehand in order to create the consumption current table TB.

Next, operation of the device system 1 having the above-described configuration will be described. Hereinafter, an example where the three field devices 10a to 10c shown in FIG. 1 are connected to the device adapter 20, and the start control of these three field devices 10a to 10c is performed, will be described. Moreover, the consumption currents of the field devices 10a to 10c are measured beforehand, and the current consumption table TB shown in FIG. 3 is stored in the storage 26 of the device adapter 20.

Figure 4:
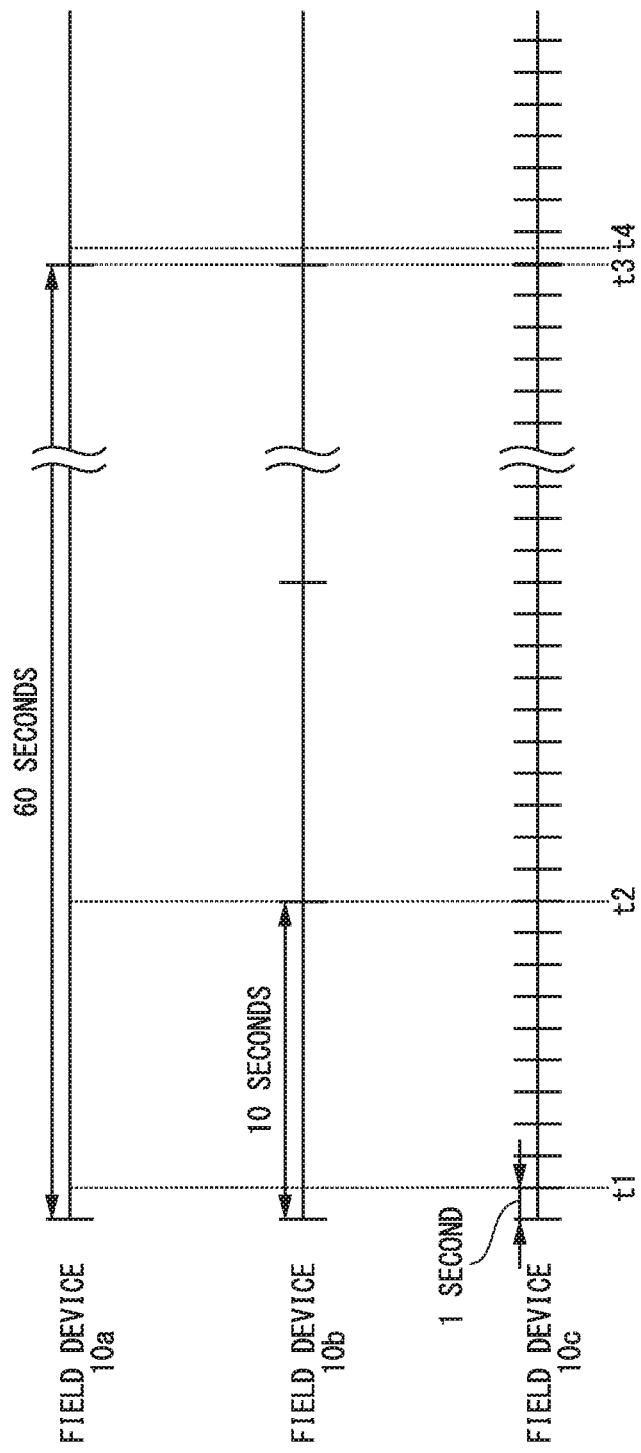
FIG. 4 is a timing chart illustrating a start timing of the field devices in an embodiment of the present invention.

Moreover, a starting cycle of the field device 10a is 60 seconds, a starting cycle of the field device 10b is 10 seconds, and a starting cycle of the field device 10c is 1 second. Basically, the start controller 25 starts the field devices 10a to 10c in accordance with the timing chart shown in FIG. 4. FIG. 4 is a timing chart illustrating a start timing of the field devices in an embodiment of the present invention. Here, referring to FIG. 4, the field device which should be started is only the field device 10c at the time t1. The field devices which should be started are the two field devices 10b and 10c at the time t2. The field devices which should be started are the three field devices 10a to 10c at the time t3.

Figure 5:
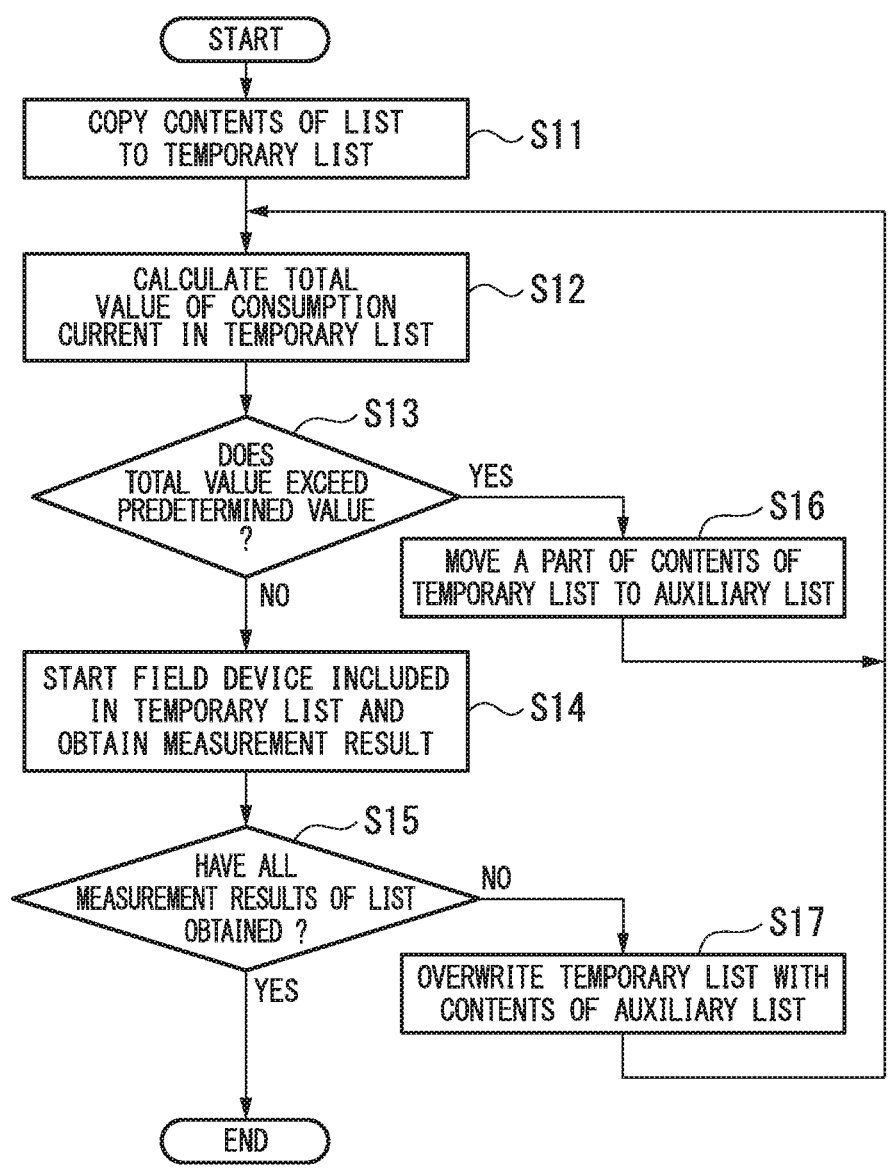
FIG. 5 is a flow chart illustrating an operation of the device system in an embodiment of the present invention.

FIG. 5 is a flow chart illustrating an operation of the device system in an embodiment of the present invention. FIG. 6 is a drawing illustrating the total consumption current in each time shown in FIG. 4. The flow chart shown in FIG. 5 is started every time at least one of the field devices 10a to 10c is started. Hereinafter, in order to understand easily, operations at the times t1, t2, and t3 shown in FIG. 4 and FIG. 6 will be described in order. Moreover, hereinafter, a condition of a current permitted in accordance with the explosion-proof standard is equal to or less than a predetermined value 12 [mA].

<Operation at the Time t1>

If the processing of the flow chart shown in FIG. 5 is started, the start controller 25 of the device adapter 20 copies information (hereinafter, "list") representing a field device which should be started first to a temporary list which is temporarily prepared in the storage 26 (Step S11). As shown in FIG. 4 and FIG. 6, since the field device which should be started is only the field device 10c, the start controller 25 copies, to the temporary list, the contents of the list in which information representing the field device 10c has been stored.

Next, the start controller 25 of the device adapter 20 calculates a total value of consumption current of the field devices included in the temporary list (Step S12: first step). Specifically, the start controller 25 reads the consumption current table TB out of the storage 26. Next, the start controller 25 calculates the total value of the consumption current of the field devices included in the temporary list by using the contents stored in the consumption current table TB read out of the storage 26. Here, since only the information representing the field device 10c is stored in the temporary list, as shown in FIG. 6, the start controller 25 calculates 3 [mA] as the total consumption current of the field device which should be started.

Next, the start controller 25 of the device adapter 20 determines whether or not the total consumption current calculated at Step S12 exceeds a predetermined current value permitted in accordance with the explosion-proof standard (Step S13: second step). Here, since the total consumption current calculated at Step S12 is 3 [mA], and it does not exceed the predetermined current value (12 [mA]) permitted in accordance with the explosion-proof standard, the determination result of Step S13 is "NO".

Next, the start controller 25 of the device adapter 20 starts the field device included in the temporary list, and the start controller 25 obtains a measurement result (Step S14: second step). Specifically, as shown in FIG. 2, the start controller 25 modulates the electric power at a time of starting power supply to the field devices 10a to 10c in accordance with the device ID assigned to the field device (here, field device 11c) which is to be started. If this processing is performed, the electric power modulated in accordance with the device ID assigned to the field device 11c is supplied to the field devices 10a to 10c through the cable CB.

If the electric power is supplied to the field devices 10a to 10c through the cable CB, the each power supplier 14 prepared in the field devices 10a to 10c calculates a number of pulses contained in the electric power. Thereafter, in the field device 10c to which the same device ID as the calculated number of pulses is assigned, the controller 15 supplies the electric power, which has been supplied through the cable CB, to the sensor 11 and the transmitter/receiver 12, and the field device 10c is started. In the other field devices 10a and 10b, since the controller 15 does not supply the electric power, which has been supplied through the cable CB, to the sensor 11 and the transmitter/receiver 12, the field devices 10a and 10b are not started.

If the field device 10c is started, the sensor 11 of the field device 10c measures pressure. The transmitter/receiver 12 transmits the measurement result of the sensor 11 to the device adapter 20. The measurement result transmitted from the transmitter/receiver 12 passes the interface 13 of the field device 10c, the cable CB, and the interface 21 of the device adapter 20 in order, and the measurement result is received by the transmitter/receiver 22 of the device adapter 20. Thereafter, the transmitter/receiver 22 wirelessly transmits the received measurement result to the control device 30 through the wireless communicator 23.

If the above-described processing ends, the start controller 25 determines whether or not all the measurement results of field devices included in the list have been obtained (Step S15). Here, since the field device included in the list is only the field device 10c, the determination result of Step S15 is "YES", and the series of the processing shown in FIG. 5 ends. Then, since the electric power supply from the device adapter 20 stops after the period T3 in the electric power waveform WF1 shown in FIG. 2, operation of the field device 10c stops. Thereafter, the start controller 25 repeatedly performs the starting processing described above at intervals of 1 second.

<Operation at the Time t2>

Next, the present time becomes the time t2 shown in FIG. 4 and FIG. 6. Then, the processing of the flow chart shown in FIG. 5 is started, and the start controller 25 of the device adapter 20 copies the list to the temporary list in the storage 26 (Step S11). Since the field devices which should be started are the two field devices 10b and 10c, the start controller 25 copies, to the temporary list, the contents of the list in which information representing these field devices 10*b* and 10*c* have been stored.

Next, the start controller 25 of the device adapter 20 calculates a total value of consumption current of the field devices included in the temporary list (Step S12). Since the information representing the field devices 10*b* and 10*c* is stored in the temporary list, as shown in FIG. 6, the start controller 25 calculates 8 [mA] as the total consumption current of the field devices which should be started.

Next, the start controller 25 of the device adapter 20 determines whether or not the total consumption current calculated at Step S12 exceeds a predetermined current value permitted in accordance with the explosion-proof standard (Step S13). Since the total consumption current calculated at Step S12 is 8 [mA], and it does not exceed the predetermined current value (12 [mA]) permitted in accordance with the explosion-proof standard, the determination result of Step S13 is "NO".

Next, the start controller 25 of the device adapter 20 starts the field devices 10*b* and 10*c* included in the temporary list, and the start controller 25 obtains measurement results (measurement results of flow quantity and pressure) (Step S14). If the start controller 25 starts the field devices 10*b* and 10*c* simultaneously, the start controller 25 modulates the electric power at a time of starting power supply to the field devices 10*a* to 10*c* in accordance with the group ID assigned to the group to which the field devices 10*b* and 10*c* belongs. Thereby, the two field devices 10*b* and 10*c*, out of the three field devices 10*a* to 10*c* connected to the device adapter 20, are started.

If the above-described processing ends, the start controller 25 of the device adapter 20 determines whether or not all the measurement results of field devices included in the list have been obtained (Step S15). Since the field devices included in the list are the field devices 10*b* and 10*c*, the determination result of Step S15 is "YES", and the series of the processing shown in FIG. 5 ends. Then, since the electric power supply from the device adapter 20 stops after the period T3 in the electric power waveform WF1 shown in FIG. 2, operations of the field devices 10*b* and 10*c* stop. Thereafter, the start controller 25 repeatedly performs the starting processing described above at intervals of 1 second with respect to the field device 10*c*, and at intervals of 10 seconds with respect to the field device 10*b*.

<Operation at the Time t3>

Next, the present time becomes the time t3 shown in FIG. 4 and FIG. 6. Then, the processing of the flow chart shown in FIG. 5 is started, and the start controller 25 of the device adapter 20 copies the list to the temporary list in the storage 26 (Step S11). Since the field devices which should be started are the three field devices 10*a* to 10*c*, the start controller 25 copies, to the temporary list, the contents of the list in which information representing these field devices 10*a* to 10*c* have been stored.

Next, the start controller 25 of the device adapter 20 calculates a total value of consumption current of the field devices included in the temporary list (Step S12). Since the information representing the three field devices 10*a* to 10*c* is stored in the temporary list, as shown in FIG. 6, the start controller 25 calculates 18 [mA] as the total consumption current of the field devices which should be started.

Next, the start controller 25 of the device adapter 20 determines whether or not the total consumption current calculated at Step S12 exceeds a predetermined current value permitted in accordance with the explosion-proof standard (Step S13). Since the total consumption current calculated at Step S12 is 18 [mA], and it exceeds the predetermined current value (12 [mA]) permitted in accordance with the explosion-proof standard, the determination result of Step S13 is "YES".

Then, the start controller 25 of the device adapter 20 moves a part of contents of the temporary list to an auxiliary list (a list temporarily prepared in the storage 26 like the temporary list) (Step S16: second step). For example, the start controller 25 moves the field device 10*a*, of which consumption current is the largest in the field devices 10*a* to 10*c*, from the temporary list to the auxiliary list. The start controller 25 may also determine a field device included in the temporary list, which is to be moved to the auxiliary list, based on a length of the starting cycle, a priority set to each field device, and so on, in addition to magnitude of the consumption current.

After the processing of moving a part of contents of the temporary list to the auxiliary list has been completed, the start controller 25 of the device adapter 20 calculates the total value of consumption current of the field devices included in the temporary list again (Step S12). The start controller 25 of the device adapter 20 determines whether or not the calculated total consumption current exceeds the predetermined current value permitted in accordance with the explosion-proof standard (Step S13).

Since the field device 10*a* is excepted from the temporary list, and the information representing the two field devices 10*b* and 10*c* is stored in the temporary list, in Step S12, as shown in FIG. 6, the start controller 25 calculates 8 [mA] as the total consumption current of the field devices which should be started. For this reason, the determination result of Step S13 is "NO".

Next, like the case at the time t2, the start controller 25 of the device adapter 20 starts the field devices 10*b* and 10*c* included in the temporary list, and the start controller 25 obtains measurement results (measurement result of flow quantity and pressure) (Step S14). Thereby, the number of field devices started at the time t3 can be dynamically decreased from three to two. Thereafter, the start controller 25 of the device adapter 20 determines whether or not all the measurement results of field devices included in the list have been obtained (Step S15).

The field devices included in the list is three field devices 10*a* to 10*c*, and the measurement result of the field device 10*a* is not obtained. For this reason, the determination result of Step S15 is "NO". The start controller 25 stops the electric power supply from the device adapter 20 to the field devices 10*b* and 10*c* of which measurement results have been obtained. Specifically, the start controller 25 stops the electric power supply to the field devices 10*b* and 10*c* after the period T3 in the electric power waveform WF1 shown in FIG. 2. For this reason, operations of the field devices 10*b* and 10*c* stop.

If the determination result of Step S15 is "NO", the start controller 25 of the device adapter 20 overwrites the temporary list with the contents of the auxiliary list (Step S17). Specifically, the start controller 25 returns the field device, which has been moved from the temporary list to the auxiliary list by the processing of Step S16, to the temporary list. If this processing ends, the processing of Step S12 and the processing of Step S13 are performed in order again.

Since only the information representing the field device 10*a* is stored in the temporary list, in Step S12, as shown in FIG. 6, the start controller 25 calculates 10 [mA] as the total consumption current of the field device which should be started. For this reason, the determination result of Step S13 is "NO".

Next, the start controller 25 of the device adapter 20 starts the field device 10a included in the temporary list, and the start controller 25 obtains a measurement result (measurement result of temperature) (Step S14). Here, as shown in FIG. 4, the field device 10a is started at a timing (time t4) which is different from the timing (time t3) when the field device should be started originally. The start controller 25 shifts the starting timing of the field device 10a from the starting timing of the field devices 10b and 10c in order to operate all the field devices 10a to 10c in conformity with an explosion-proof standard.

If the above-described processing ends, the start controller 25 of the device adapter 20 determines whether or not all the measurement results of field devices included in the list have been obtained (Step S15). The field devices included in the list are the three field devices 10a to 10c, and all the measurement results of the field devices 10a to 10c have been obtained by the above processing. For this reason, the determination result of Step S15 is "YES", and the series of the processing shown in FIG. 5 ends. Then, since the start controller 25 stops the electric power supply to the field device 10a after the period T3 in the electric power waveform WF1 shown in FIG. 2, operations of the field device 10a stops. Thereafter, the start controller 25 repeatedly performs the starting processing described above at intervals of 1 second with respect to the field device 10c, at intervals of 10 seconds with respect to the field device 10b, and at intervals of 60 seconds with respect to the field device 10a.

As described above, in the present embodiment, the start controller 25 of the device adapter 20 performs the start control of the field devices 10a to 10c connected to the interface 21 to make the total power consumption of the field devices 10a to 10c connected to the interface 21 of the device adapter 20 be within the range permitted in accordance with the explosion-proof standard. For this reason, a plurality of field devices can be operated in conformity with an explosion-proof standard.

As described above, although a device adapter, a device system, and a start control method according to the embodiment of the present invention have been described above, the present invention is not restricted to the above-described embodiments, and can be freely modified within the scope thereof. For example, although the device system 1 is equipped with the device adapter 20 which performs wireless communication in conformity with ISA100.11a, the present invention can also be adapted to a device system equipped with a device adapter which performs wireless communication in conformity with WirelessHART (registered trademark), a device adapter which performs wireless communication in conformity with Wi-Fi (registered trademark), or a device adapter which performs wireless communication in conformity with ZigBee (registered trademark).

Moreover, in the above-described embodiment, although the device adapter 20 which is a wireless module (a module which wirelessly transmits signals which has been transmitted from the field devices 10a to 10c, and receives signals which has been wirelessly transmitted toward the field devices 10a to 10c) has been described as an example, the device adapter 20 may be a module other than the wireless module. For example, the device adapter 20 may have communication functions other than wireless communication, such as field bus communication, Ethernet (registered trademark) communication, USB (Universal Serial Bus) communication, and serial communication. Furthermore, the device adapter 20 may have functions other than communication functions, such as a display function, a user interface function, and a data storage function. Moreover, the device adapter 20 and the field device may be stored in the same housing.

Moreover, if a field device 10d is newly connected to the device adapter 20, the start controller 25 may update the consumption current table TB stored in the storage 26. Specifically, the start controller 25 stops electric power supply to the field devices 10a to 10c, and starts only the field device 10d newly connected to the device adapter 20. Thereafter, the consumption current measurer 25a measures the consumption current of the field device 10d. The start controller 25 may update the consumption current table TB stored in the storage 26 by using the consumption current of the field device 10d measured by the consumption current measurer 25a. Thus, the start controller 25 updates the consumption current table TB automatically so that a worker's operation load at a time of newly connecting the field device to the device adapter 20 can be reduced.

REFERENCE SIGNS LIST 10a to 10c Field devices
20 Device adapter
21 Interface
24 Power source
25 Start controller
23 Wireless communicator

The invention claimed is:
1. A device adapter comprising:
an interface which is connectable to field devices;
a power source configured to supply electric power to the field devices connected to the interface; and
a start controller configured to perform a start control of the field devices connected to the interface to make a total power consumption of the field devices connected to the interface be within a range permitted in accordance with an explosion-proof standard.
2. The device adapter according to claim 1,
wherein the start controller is configured to dynamically calculate the total power consumption of the field devices which should be started, and
wherein if the total power consumption exceeds the range permitted in accordance with the explosion-proof standard, the start controller dynamically changes a number of the field devices which should be started.
3. The device adapter according to claim 1,
wherein the start controller is configured to start the field devices connected to the interface individually beforehand to measure a power consumption of each of the field devices which are in an operating state.
4. The device adapter according to claim 1,
wherein first identification information which is determined uniquely is assigned to each of the field devices, and
wherein the start controller is configured to perform the start control of the field devices by modulating the electric power supplied from the power source to the field devices in accordance with the first identification information.
5. The device adapter according to claim 1,
wherein the field devices are classified into groups which have been set to make the total power consumption be within the range permitted in accordance with the explosion-proof standard,
wherein second identification information which is determined uniquely is assigned to each of the groups, and wherein the start controller is configured to perform the start control of the field devices by modulating the electric power supplied from the power source to the field devices in accordance with the second identification information.

6. The device adapter according to claim 1, further comprising:
a wireless communicator configured to wirelessly transmit signals which have been transmitted from the field devices, and receive signals which have been wirelessly transmitted toward the field devices.

7. The device adapter according to claim 1, further comprising:
a storage which stores a table representing a consumption current of each of the field devices in an operating state,
wherein the start controller is configured to calculate, based on the table stored in the storage, the total power consumption of the field devices which should be started.

8. The device adapter according to claim 7,
wherein if a field device is newly connected to the device adapter, the start controller measures a power consumption of the field device which is newly connected to the device adapter, and updates the table stored in the storage by using the measured power consumption.

9. A device system comprising:
field devices; and
a device adapter which is connectable to the field devices,
wherein the device adapter comprises:
an interface which is connectable to the field devices;
a power source configured to supply electric power to the field devices connected to the interface; and
a start controller configured to perform a start control of the field devices connected to the interface to make a total power consumption of the field devices connected to the interface be within a range permitted in accordance with an explosion-proof standard.

10. The device system according to claim 9,
wherein the start controller is configured to dynamically calculate the total power consumption of the field devices which should be started, and
wherein if the total power consumption exceeds the range permitted in accordance with the explosion-proof standard, the start controller dynamically changes a number of the field devices which should be started.

11. The device system according to claim 9,
wherein the start controller is configured to start the field devices connected to the interface individually beforehand to measure a power consumption of each of the field devices which are in an operating state.

12. The device system according to claim 9,
wherein first identification information which is determined uniquely is assigned to each of the field devices, and
wherein the start controller is configured to perform the start control of the field devices by modulating the electric power supplied from the power source to the field devices in accordance with the first identification information.

13. The device system according to claim 9,
wherein the field devices are classified into groups which have been set to make the total power consumption be within the range permitted in accordance with the explosion-proof standard,
wherein second identification information which is determined uniquely is assigned to each of the groups, and wherein the start controller is configured to perform the start control of the field devices by modulating the electric power supplied from the power source to the field devices in accordance with the second identification information.

14. The device system according to claim 9, further comprising:
a wireless communicator configured to wirelessly transmit signals which have been transmitted from the field devices, and receive signals which have been wirelessly transmitted toward the field devices.

15. The device system according to claim 9, further comprising:
a storage which stores a table representing a consumption current of each of the field devices in an operating state,
wherein the start controller is configured to calculate, based on the table stored in the storage, the total power consumption of the field devices which should be started.

16. The device system according to claim 15,
wherein if a field device is newly connected to the device adapter, the start controller measures a power consumption of the field device which is newly connected to the device adapter, and updates the table stored in the storage by using the measured power consumption.

17. A start control method comprising:
identifying, by a start controller, field devices which should be started out of field devices connected to a device adapter;
calculating, by the start controller, a total power consumption of the identified field devices; and
performing, by the start controller, the start control of the field devices to make the calculated total power consumption be within a range permitted in accordance with an explosion-proof standard.

18. The start control method according to claim 17, further comprising:
dynamically calculating, by the start controller, the total power consumption of the field devices which should be started, and
dynamically changing, by the start controller, a number of the field devices which should be started if the total power consumption exceeds the range permitted in accordance with the explosion-proof standard.

19. The start control method according to claim 17,
wherein first identification information which is determined uniquely is assigned to each of the field devices, and
wherein the start control method comprises:
performing, by the start controller, the start control of the field devices by modulating the electric power supplied from the power source to the field devices in accordance with the first identification information.

20. The start control method according to claim 17,
wherein the field devices are classified into groups which have been set to make the total power consumption be within the range permitted in accordance with the explosion-proof standard, and
wherein second identification information which is determined uniquely is assigned to each of the groups,
wherein the start control method comprises:
performing, by the start controller, the start control of the field devices by modulating the electric power supplied from the power source to the field devices in accordance with the second identification information.

\* \* \* \* \*